(12) United States Patent
Kim et al.

(10) Patent No.: US 7,307,812 B2
(45) Date of Patent: Dec. 11, 2007

(54) FILTERING APPARATUS FOR DISK DRIVE

(75) Inventors: Do-wan Kim, Suwon-si (KR);
Woo-cheol Jeong, Anyang-si (KR);
Tae-soo Kim, Suwon-si (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 413 days.

(21) Appl. No.: 10/910,330

(22) Filed: Aug. 4, 2004

(65) Prior Publication Data

US 2005/0041334 A1    Feb. 24, 2005

(30) Foreign Application Priority Data

Aug. 23, 2003    (KR)    ............ 10-2003-0058499

(51) Int. Cl.
*G11B 33/14*    (2006.01)
(52) U.S. Cl. .................................. 360/97.02
(58) Field of Classification Search ............. 360/97.02; 720/648
See application file for complete search history.

(56) References Cited

U.S. PATENT DOCUMENTS 6,507,452 B1* 1/2003 Bae et al. ................ 360/97.02
6,618,222 B1* 9/2003 Watkins et al. .......... 360/97.02
2002/0021527 A1* 2/2002 Rannow et al. .......... 360/97.02

FOREIGN PATENT DOCUMENTS

| JP | 6-203548 | 7/1994 |
|---|---|---|
| JP | 7-320478 | 12/1995 |
| JP | 8-102181 | 4/1996 |
| JP | 8-129871 | 5/1996 |
| JP | 2003-151258 | 5/2003 |
| KR | 2000-0050563 | 8/2000 |

\* cited by examiner

*Primary Examiner*—Julie Anne Watko
(74) *Attorney, Agent, or Firm*—Staas & Halsey LLP (57) ABSTRACT

A filtering apparatus of a hard disk drive which includes an actuator to move a read/write head to a predetermined position over a disk and a flexible printed circuit (FPC) bracket installed in a corner of the base member. The filtering apparatus includes: a filter holder protruding from one side of the FPC bracket toward the read/write head; and a filter disposed in the filter holder which filters foreign materials in air flowing in the disk drive.

23 Claims, 7 Drawing Sheets

FILTERING APPARATUS FOR DISK DRIVE

CROSS-REFERENCE TO RELATED APPLICATION

This application claims the priority of Korean Patent Application No. 2003-58499, filed on Aug. 23, 2003, in the Korean Intellectual Property Office, the disclosure of which is incorporated herein in its entirety by reference.

BACKGROUND OF THE INVENTION

1. Field of the Invention

The present invention relates to a disk drive, and more particularly, to a filtering apparatus for a disk drive to filter foreign materials in the disk drive.

2. Description of Related Art

Hard disk drives (HDDs) as data storage devices for a computer reproduce or record data with respect to a disk by using a read/write head. In the hard disk drive, the read/write head reproduces or records data while being moved by an actuator to a desired position in a state of being lifted to a predetermined height from a recording surface of the rotating disk.

Figure 1:
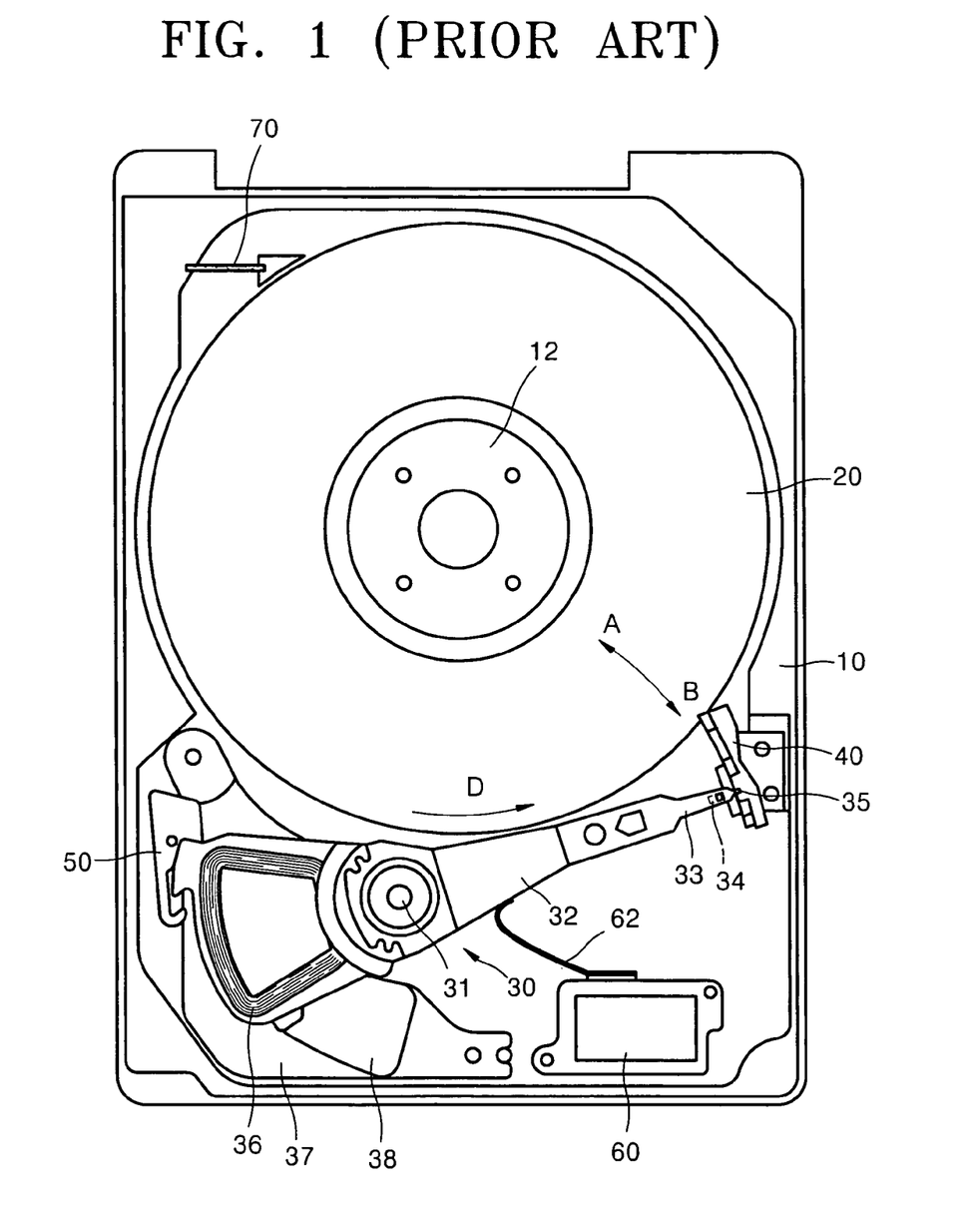
FIG. 1 is a plan view illustrating the structure of the conventional hard disk drive.
Figure 2:
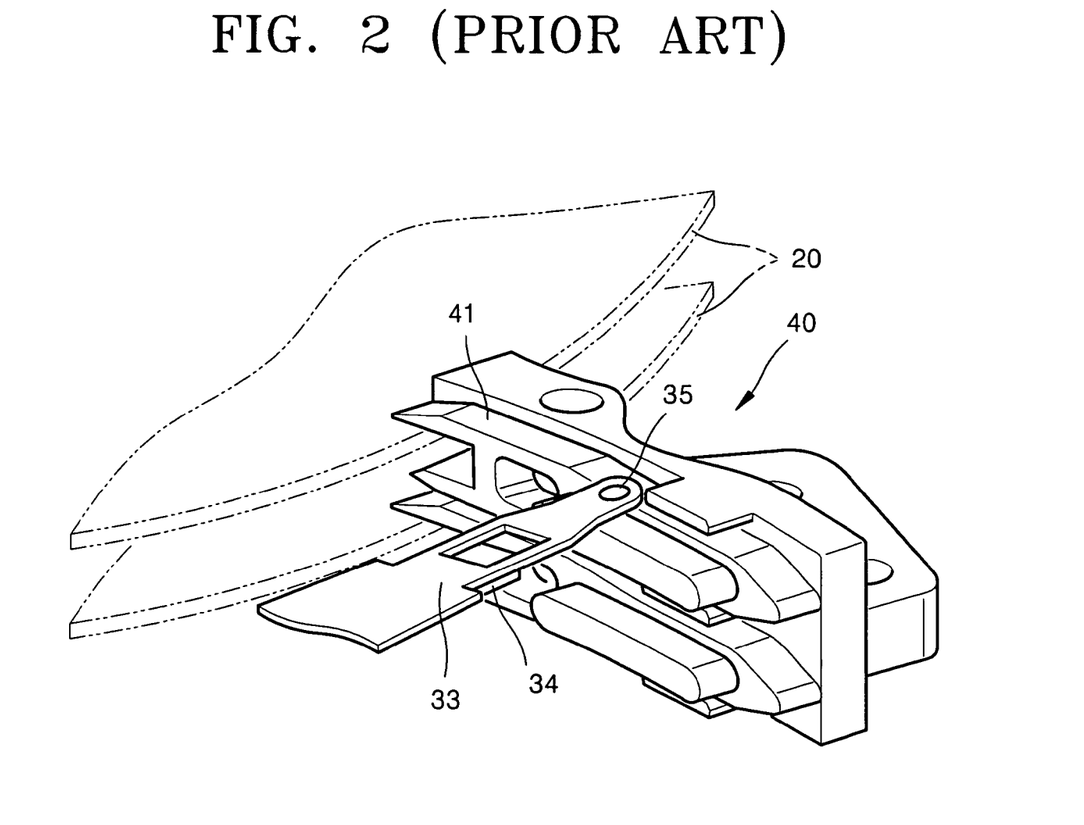
FIG. 2 is a magnified perspective view illustrating the lamp and the suspension portion of the actuator shown in FIG. 1.

FIG. 1 is a plan view illustrating the structure of a conventional 2.5 inch hard disk drive. FIG. 2 is a magnified perspective view illustrating a suspension portion of an actuator and a ramp shown in FIG. 1.

Referring to FIGS. 1 and 2, the hard disk drive includes a spindle motor 12 installed on a base member 10, at least one disk 20 fixed to the spindle motor 12, and an actuator 30 to move a read/write head (not shown) for reproducing and recording data to a specified position on the disk 20. The actuator 30 includes a swing arm 32 rotatably coupled to a pivot bearing 31 installed on the base member 10, a suspension 33 installed at one end portion of the swing arm 32 and supporting a slider 34, where the read/write head is mounted, to be elastically biased toward a surface of the disk 20, and a voice coil motor (VCM) to rotate the swing arm 32. The voice coil motor includes a VCM coil 36 coupled to the other end portion of the swing arm 32, a lower yoke 37 installed under the VCM coil 36, and a magnet 38 attached to an upper surface of the lower yoke 37. Although not shown in the drawing, the voice coil motor may include an upper yoke installed above the VCM coil 36 and a magnet attached to a lower surface of the upper yoke.

The voice coil motor having the above structure is controlled by a servo control system and rotates the swing arm 32 in a direction according to the Fleming's left hand rule by an interaction between current applied to the VCM coil 36 and a magnetic field generated by the magnet 38. When the hard disk drive is turned on and the disk 20 is rotated in a direction D, the voice coil motor rotates the swing arm 32 counterclockwise, i.e., in a direction A, so that the read/write head is moved over the recording surface of the disk 20. The slider 34 is lifted to a predetermined height from the surface of the disk 20 by a lift force generated by the rotation of the disk 20. In this state, the read/write head mounted on the slider 34 reproduces or records data with respect to the recording surface of the disk 20.

When the hard disk drive is not in operation, that is, the rotation of the disk 20 is stopped, the read/write head is parked at a position out of the recording surface of the disk 20 so that the read/write head does not collide with the recording surface of the disk 20. The head parking system can be classified into a contact start stop (CSS) method and a ramp loading method. In the CSS method, a parking zone where data is not recorded is provided at an inner circumferential side of the disk 20 and the read/write head is parked in the parking zone in a contact manner. However, in a head parking system in the CSS method, since the parking zone is provided at the inner circumferential side of the disk 20, a space for storing data is lessened. Thus, to meet the recent trend toward a higher data recording density, a ramp loading type head parking system which can secure a wider data storage space is widely adopted.

According to the ramp loading method, a ramp 40 is installed outside the disk 20 so that the read/write head is parked on the ramp 40. To this end, an end-tab 35 which contacts and supports a support surface 41 of the ramp 40 is extended from an end portion of the suspension 33. The end-tab 35 generally has a bulge toward the support surface 41 to reduce a contact area between the end-tab 35 and the support surface 41 of the ramp 40.

When the hard disk drive is turned off so that the rotation of the disk 20 is stopped, the voice coil motor rotates the swing arm 32 clockwise in a direction B. Accordingly, the end-tab 35 is unloaded from the disk 20 and moved over the support surface 41 of the ramp 40. When the hard disk drive is turned on and the disk 20 starts to rotate, the end-tab 35 is moved out of the support surface 41 of the ramp 40 and loaded over the disk 20, by the rotation of the swing arm 32.

When the read/write head is parked on the ramp 40, the read/write head may escape from the ramp 40 and move toward a recording surface of the disk 20 as the actuator 30 is arbitrarily moved by external impacts or vibrations applied to the disk drive. In this case, the read/write head contacts the recording surface of the disk 20 and the read/write head and the recording surface may be damaged. Thus, an actuator latch 50 is provided to lock the actuator 30 at a particular position so as not to be moved arbitrarily when the rotation of the disk 20 stops and the read/write head is parked on the ramp 40.

A flexible printed circuit (FPC) bracket 60 to connect a flexible printed circuit 62 connected to the actuator 30 to a printed circuit board (not shown) arranged on a lower surface of the base member 10 is installed at one corner of the base member 10.

In the hard disk drive having the above structure, foreign materials such as particles or gas are generated in the following situation.

Figure 3:
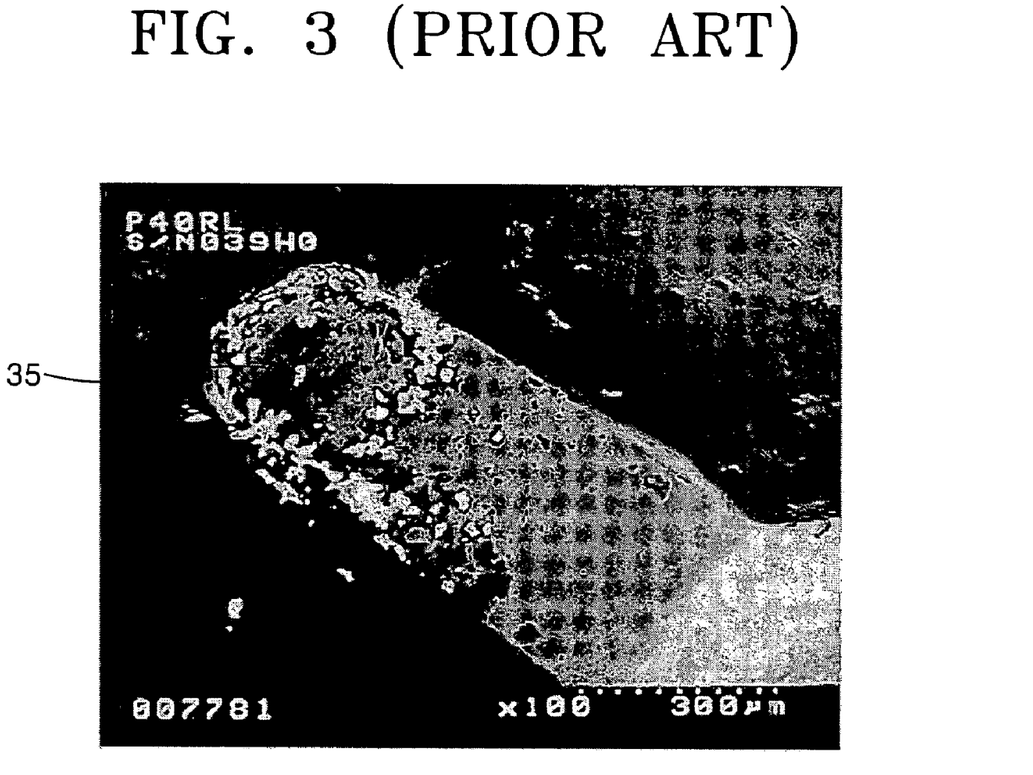
FIG. 3 is an electron microscope image of particles on and around the end-tab shown in FIG. 2.

When the end-tab 35 is moved toward the disk 20 or over the support surface 41 of the ramp 40, sliding friction occurs between the end-tab 35 and the support surface 41 of the ramp 40. When such friction is repeated, the support surface 41 of the ramp 40 which is generally formed of plastic is worn so that particles are generated. FIG. 3 shows particles adhering to and around the end-tab 35. In addition, when the read/write head is lifted over the surface of the disk 20, the read/write head collides with the surface of the disk 20 by the external impacts or vibrations so that particles are generated due to friction and wear between the read/write head and the disk 20.

Also, in the hard disk drive, there are parts which are electrodeposition coated or nickel coated and parts such as a VCM coil 36 coupling portion of the actuator 30 and the ramp 40 which are formed of plastic. In a burn-in step of servo compensation, defect free, and head performance check, or after the disk drive is driven for a time, the temperature of the disk drive becomes high. In the high temperature state, gas is generated from the above parts. While moving according to the principle of the Brownian movement, molecules of the gas cause chemical reactions or collide with one another so that particles having a size of several hundreds nanometers are generated.

The particles flow inside the hard disk drive along the airflow caused by the rotation of the disk 20. The size of the flowing particle are various from several nanometers to several hundred nanometers. A particle which is greater than an interval (space) between the read/write head and the disk 20, that is, a flying height of the read/write head, collides with the read/write head to change the posture of the read/write head. Accordingly, the read/write head contacts the disk 20 and scratches the recording surface of the disk 20, which damages the disk and distorts a magnetic signal therefrom. In addition, the collision between the particle and the read/write head may damage a read/write sensor of the read/write head. A particle which is smaller than the flying height may intrude between the read/write head and the surface of the disk 20 so that the read/write head is damaged or scratches are made on the surface of the disk 20.

Hard disk drives are being developed to be ultra-light and compact and have a high capacity. To meet these criteria, the track per inch (TPI) is remarkably increased to increase a storage capacity of a disk while the flying height of the read/write head is decreasing. As a result, the head can be easily damaged by even smaller particles and the magnetic signal on the disk surface can be easily damaged by even smaller scratches.

Thus, to prevent the above problems, foreign materials such as particles or gas generated in the disk drive need to be collected and removed. Conventionally, as shown in FIG. 1, a circulation filter 70 is arranged in a corner of the base member 10 to filter foreign materials such as particles included in air flowing inside the disk drive. However, the circulation filter 70 arranged as above does not provide a satisfactory filtering effect as described below.

Figure 4:
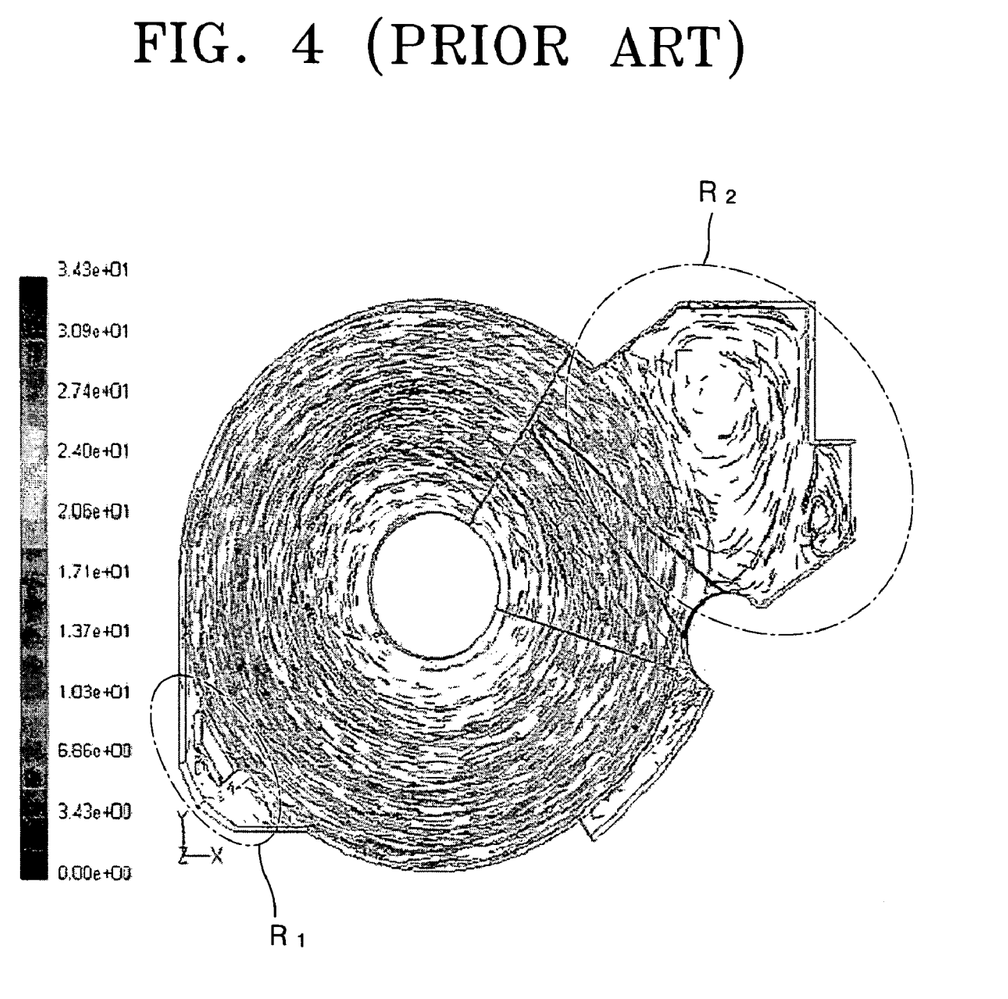
FIG. 4 is a view showing the result of simulation of the distribution of speed of particles flowing on and around the surface of a rotating disk in the conventional hard disk drive shown in FIG. 1.

FIG. 4 shows the result of simulation of the distribution of speed of particles flowing on and around the surface of a rotating disk in the conventional 2.5 inch hard disk drive shown in FIG. 1.

Referring to FIG. 4, as the disk rotates, airflow is generated in the disk drive and particles in the disk drive is moved along with the air flow. The flowing speed of the particles is almost proportional to the flow speed of the air. Accordingly, as shown in the drawing, on the disk surface, the flow speed of the particles is faster at a position close to the outer circumference of the disk while the flow speed of the particles is slower at a position close to the inner circumference of the disk. However, as shown in FIG. 4, the airflow hardly exists in an area R1 outside the disk where the conventional circulation filter 70 is arranged so that the particles hardly flow toward the circulation filter 70. Therefore, the conventional circulation filter hardly functions to collect particles in the area R1.

BRIEF SUMMARY

To solve the above and/or other problems, the present invention provides a filtering apparatus for a disk drive which is formed integrally with an FPC bracket so that foreign materials in the disk drive can be effectively filtered and handling and assembly thereof is easy.

According to an aspect of the present invention, there is provided a filtering apparatus of a hard disk drive which includes an actuator to move a read/write head to a predetermined position over a disk and a flexible printed circuit (FPC) bracket installed in a corner of the base member. The filtering apparatus includes a filter holder protruding from one side of the FPC bracket toward the read/write head; and a filter disposed in the filter holder which filters foreign materials in air flowing in the disk drive.

The filter holder may be integrally formed with the FPC bracket in a plastic injection molding method.

The filter holder may have a "U" shape with an upper side open. The filter holder may have a first filter support groove configured to accept at least one side end portion of the filter and a second filter support groove configured to accept a lower end portion of the filter.

The filter holder may have a guide portion at an end which guides a flow of air toward the filter and forms an air flow path between the guide portion and the FPC bracket.

The guide portion may be integrally formed with the filter holder in a plastic injection molding method.

The guide portion may be formed in a direction perpendicular to a lengthwise direction of the filter holder.

A width of the airflow path may gradually increase as the air flow path gets further away from the filter. The guide portion may have an arch shape.

According to another aspect of the present invention, there is provided a hard disk drive including: a base with a bracket in a corner of the base; a recording/reproducing section; and a filter section disposed between the bracket and the recording/reproducing section which filters foreign materials from air in the hard disk drive.

According to another aspect of the present invention, there is provided a filtering arrangement for a hard disk drive having a bracket in a corner thereof. The filtering arrangement includes a filter; a filter holder which includes a guide portion at an end opposite the bracket; and an air flow passage formed between the guide portion and the bracket which guides air trough the filter.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 5:
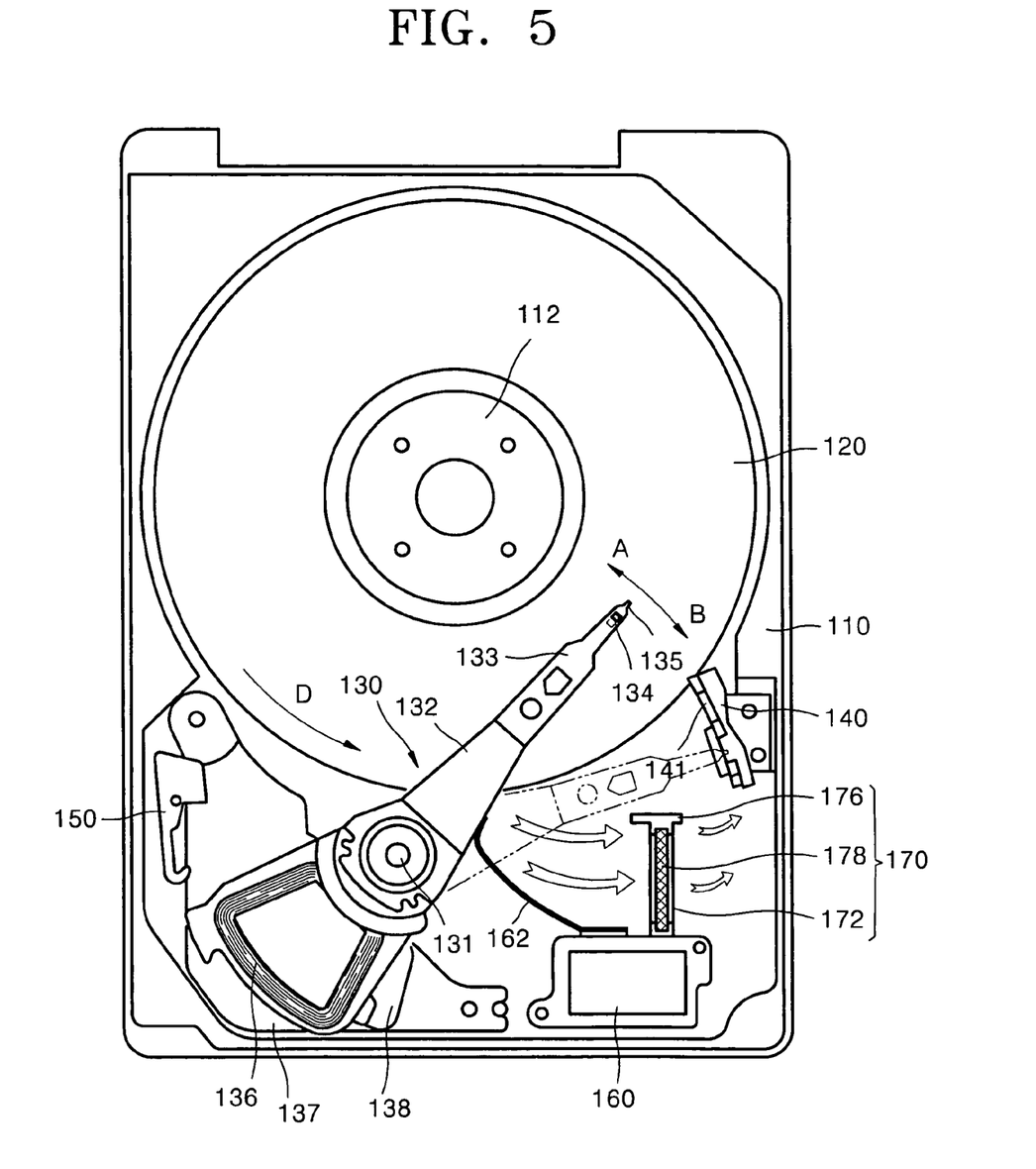
FIG. 5 is a plan view illustrating a disk drive having a filtering apparatus according to a first embodiment of the present invention.
Figure 6:
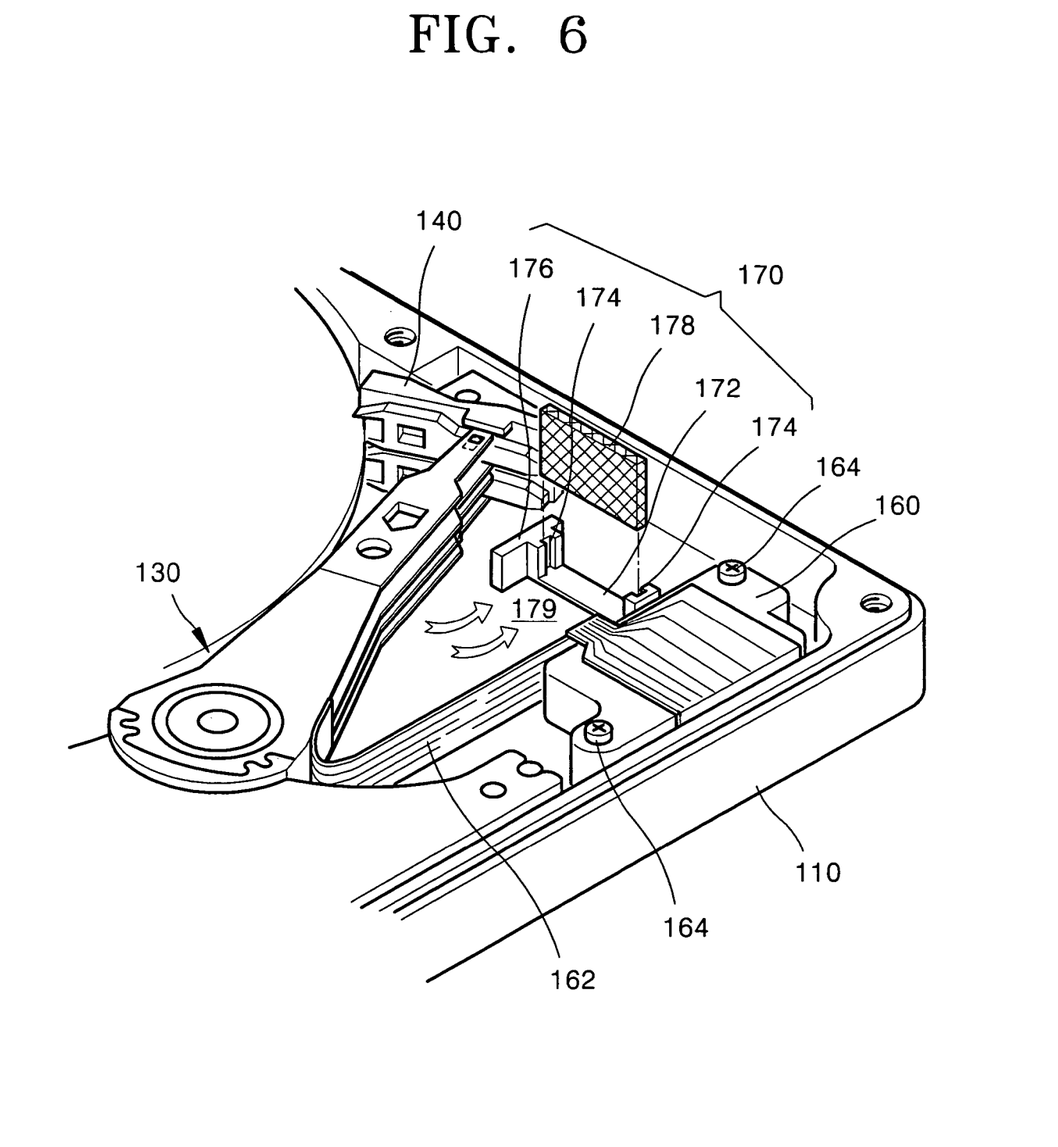
FIG. 6 is a magnified perspective view of the filtering apparatus of FIG. 5.

Referring to FIGS. 5 and 6, a filtering apparatus 170 according to a first embodiment of the present invention, which is adopted in a disk drive for reproducing and recording data with respect to a disk 120, filters and removes particles flowing in the disk drive.

The disk drive includes a base member 110, a spindle motor 112 to rotate the disk 120, an actuator 130, an FPC (flexible printed circuit) bracket 160, and the filtering apparatus 170 according to the present embodiment.

The spindle motor 112 is installed on the base member 110 of the disk drive. At least one disk 120 is installed on a hub (not shown) of the spindle motor 112 and rotated with the hub.

The actuator 130 moves a read/write head (not shown) for recording and reproducing data to a specified position on the disk 120, and includes a swing arm 132, a slider 134 on which the read/write head is mounted, a suspension 133, and a voice coil motor (VCM) including a VCM coil, a lower yoke 137, and a magnet 138. The swing arm 132 is rotatably coupled to a pivot bearing 131 which is installed on the base member 110. The suspension 133 is coupled to a leading end portion of the swing arm 132 to support the slider 134 to be elastically biased to a surface of the disk 120. An end-tab 135 which contacts a support surface 141 of a ramp 140 and is supported thereon is extended from an end portion of the suspension 133.

The voice coil motor provides a driving force to rotate the swing arm 132 and is controlled by a servo control system. The swing arm 132 is rotated in a direction following the Fleming's left hand rule by an interaction between current applied to the VCM coil 136 and a magnetic field generated by the magnet 138. The VCM coil 136 is coupled to a rear end portion of the swing arm 132. The magnet 138 is attached to an upper surface of a lower yoke 137 which is installed under the VCM coil 136. When the disk drive is turned on and the disk 120 starts to rotate, the voice coil motor rotates the swing arm 132 counterclockwise, i.e., in a direction A indicated by an arrow in the drawing, so that the read/write head is moved over a recording surface of the disk 120. Conversely, when the disk drive is turned off and the disk 120 stops rotation, the voice coil motor rotates the swing arm 132 clockwise, i.e., in a direction B indicated by an arrow in the drawing, so that the read/write head escapes out of the disk 120.

The read/write head escaped the recording surface of the disk 120 is parked on the ramp 140 provided outside the disk 120. When the rotation of the disk 120 is stopped, the voice coil motor rotates the swing arm 132 in the direction B. Accordingly, the end-tab 135 formed on the end portion of the suspension 133 is parked on the support surface 141 of the ramp 140. An actuator latch 150 is provided in the disk drive, which locks the actuator 130 so as not to rotate arbitrarily by an external impact or vibration applied to the disk drive when the read/write head is parked on the ramp 140.

The FPC bracket 160 connects a flexible printed circuit (FPC) 162, which is connected to the actuator 130, to a printed circuit board (not shown) provided at a lower surface of the base member 110. The FPC bracket 160 is installed in a corner of the base member 110 close to the actuator 130 by screws 164.

In the disk drive having the above structure, foreign materials such as particles or gasare generated so that a filtering apparatus 170 according to the present embodiment is provided to filter the foreign materials. The filtering apparatus 170 is arranged in an area outside the disk 120, where the amount of air flow is relatively large and the air flow speed is relatively high, to improve the foreign material collection efficiency in the disk drive. Referring to FIG. 4, it can be seen that the amount of airflow and the amount of particles in an area R2 where the ramp 140 and the FPC bracket 160 are installed, outside the disk 120, are greater than those in the area R1 where the conventional filter is installed. Accordingly, the filtering apparatus 170 according to the present embodiment is provided in a space among the ramp 140, the actuator 130, and the FPC bracket 160.

The filtering apparatus 170 according to the first embodiment of the present invention includes a filter holder 172 and a filter 178 installed on the filter holder 172.

The filter 178 filters foreign materials included in the air flowing in the disk drive and is formed of a filter medium which is a porous material, such as, sponge, through which air can pass to filter the foreign material from the flowing air.

A support structure is needed to install the space among the ramp 140, the actuator 130, and the FPC bracket 160. However, it is not necessary to form the support structure on the base member 110 due to difficulty in change of the shape of the base member 110, difficulty in assembly of the filter 178, and instability in supporting the filter 178.

Accordingly, in the present embodiment, the support structure to support the filter 178, that is, the filter holder 172, is integrally formed with the FPC bracket 160. However, the support structure need not be integrally formed. The filter holder 172 protrudes from one side of the FPC bracket 160 toward the head mounted on an end portion of the actuator 130. Such a structure is formable by incorporating the filter holder 172 and the FPC bracket 160 in a plastic injection molding method.

According to this structure, the filtering apparatus 170 according to the present embodiment is easy to handle and assembly and an additional cost is required for manufacturing thereof.

The filter holder 172 may have a variety of structures to firmly support the filter 178, such as, for example, a "U" shape with an upper side open, as shown in FIG. 6. A filter support groove 174 having a specified depth is formed in vertical surfaces of the filter holder 172 facing each other so that both side end portions of the filter 178 are respectively inserted in each filter support groove 174 and thus firmly supported thereby.

A guide portion 176 to guide the airflow toward the filter 178 is provided at an end portion of the filter holder 172. The guide portion 176 is formed perpendicular to a lengthwise direction of the filter holder 172, that is, a direction parallel to the side surface of the FPC bracket 160. Accordingly, since an airflow path 179 is formed between the guide portion 176 and the FPC bracket 160, a greater amount of the air in the disk drive can flow toward the filter 178 through the airflow path 179. Thus, a foreign material collection efficiency by the filter 178 may be improved further. However, it is to be understood that the guide portion 176 may be formed other ways.

The guide portion 176 is formed integrally with the filter holder 172 in the plastic injection molding method for the same reason described above. However, it is to be understood that the guide portion need not be integral with the filter holder 172.

Referring to FIG. 5, when the disk drive is turned on and the disk 120 starts to rotate in the direction D, the voice coil motor rotates the actuator 130 counterclockwise in the direction A. Simultaneously, the airflow is formed by the rotation of the disk 120 so as to flow toward the filtering apparatus 170. The airflow is guidable by the flexible printed circuit 162 to the filtering apparatus 170. Also, more air and particles are directed toward the filter 178 by the guide portion 176. The air flowing toward the filter 178 passes through the filter 178 and the particles or gas included in the airflow are filtered by the filter 178 and removed from the air. Thus, the damage to the surface of the disk 120 and the head due to the foreign materials is lessened so that performance and reliability of the disk drive are improved.

Figure 7:
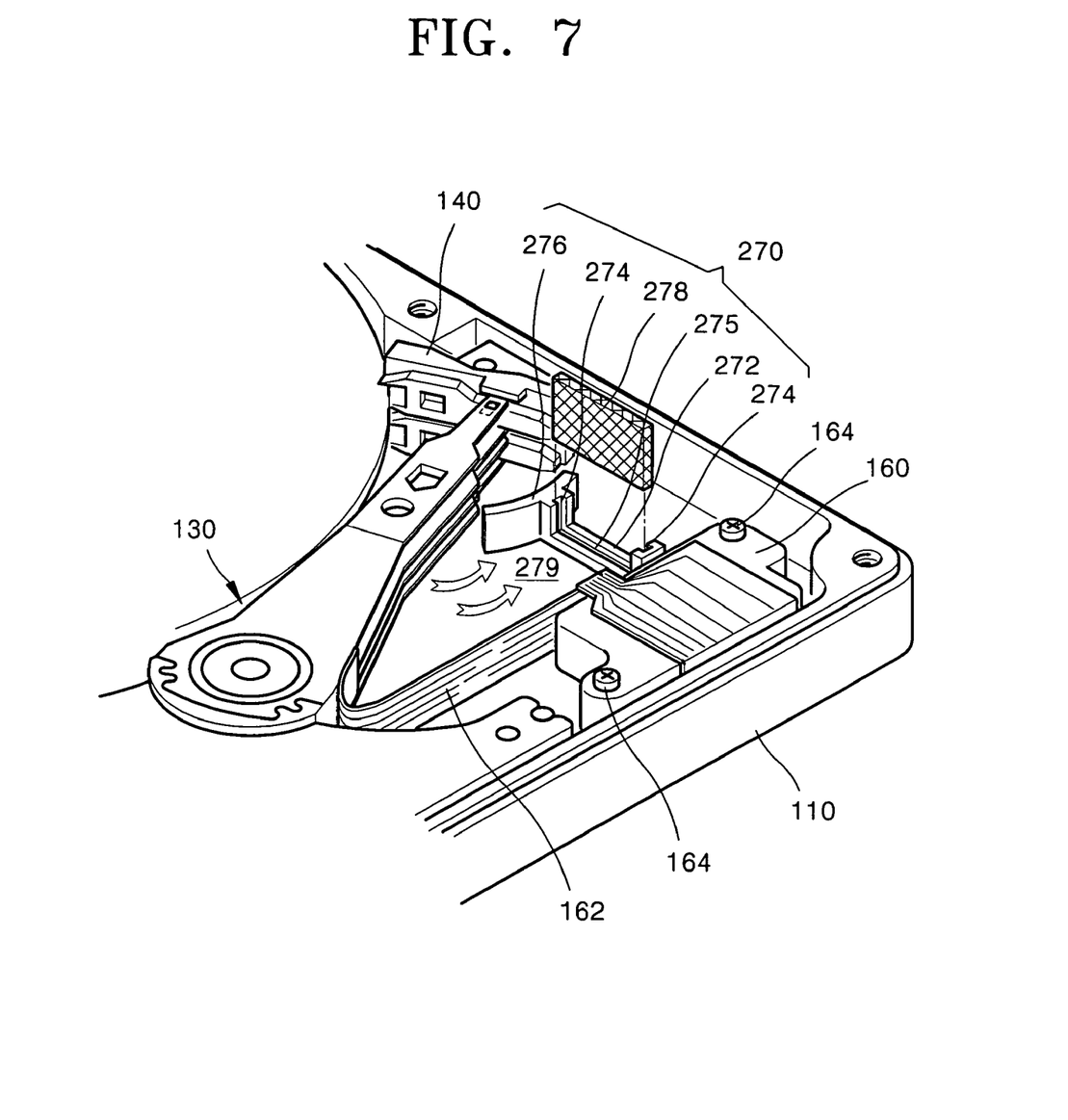
FIG. 7 is a magnified perspective view illustrating a disk drive having a filtering apparatus according to a second embodiment of the present invention.

FIG. 7 shows a filtering apparatus according to a second embodiment of the present invention. Referring to FIG. 7, the basic structure of a filtering apparatus 270 according to a second embodiment of the present invention is the same as that of the filtering apparatus 170 according to the first embodiment. The filtering apparatus 270 includes a filter holder 272 integrally formed with the FPC bracket 160 and a filter 278 installed in the filter holder 272 to filter foreign materials included in the air flow in the disk drive. The filtering apparatus 270 further includes a guide portion 276 which guides the air flow toward the filter 278. The filter holder 272 and the guide portion 276 are integrally formable with the FPC bracket 160 in a plastic injection molding method. Since the structure and effect of the filtering apparatus 270 are the same as those of the filtering apparatus 170 according to the first embodiment, detailed descriptions thereof are omitted herein.

In the second embodiment of the present invention, the filter holder 272 has a filter support groove 274, in which both side end portions of the filter 278 are inserted, formed in each of vertical surfaces of the filter holder 272 facing each other, and a filter support groove 275, in which a lower end portion of the filter 278 is inserted, formed in a bottom surface thereof. Thus, the filter 278 can be firmly supported by the filter support grooves 274 and 275.

In the second embodiment, the guide portion 276 has an arch shape. Accordingly, the width of an air flow path 279 formed between the guide portion 276 and the FPC bracket 160 gradually increases as the air flow path 279 gets further away from the filter 278 so that the air flowing in the disk drive can further flow toward the filter 278.

As described above, since the filtering apparatus according to the present invention is provided the area where the FPC bracket is installed where the amount of airflow is relatively large, foreign materials included in the disk drive are effectively filtered. Thus, the damage to the disk surface and the head is prevented so that the performance and reliability of the disk drive are improved.

Also, since the filtering apparatus according to the above-described embodiments of the present invention is formed integrally with the FPC bracket, handling and assembly thereof is easy and no additional cost is needed for manufacturing thereof.

Furthermore, since the filtering apparatus according to the above-described embodiments of the present invention has the guide portion to guide the air flow in the disk drive toward the filter, a large amount of air flows toward the filter so that a filtering efficiency is improved.

The present invention, although described above based on the ramp loading type hard disk drive, is applicable to a CSS type hard disk drive.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A filtering apparatus of a hard disk drive which includes an actuator to move a read/write head to a predetermined position over a disk and a flexible printed circuit (FPC) bracket installed in a corner of the base member, comprising:
    a filter holder protruding from one side of the FPC bracket toward the read/write head and in an area of relatively great air flow and high air flow velocity when the disk is rotated, the area being between a ramp, the actuator, and the FPC bracket; and
    a filter disposed in the filter holder, which filters foreign materials in air flowing in the disk drive.

2. The filtering apparatus of claim 1, wherein the filter holder is integrally formed with the FPC bracket.

3. The filtering apparatus of claim 2, wherein the filter holder and the FPC bracket are formed by plastic injection molding.

4. The filtering apparatus of claim 1, wherein the filter holder has a "U" shape with an upper side open.

5. The filtering apparatus of claim 1, wherein the filter holder has a first filter support groove configured to accept at least one side end portion of the filter i.

6. The filtering apparatus of claim 5, wherein the filter holder has a second filter support groove configured to accept a lower end portion of the filter.

7. The filtering apparatus of claim 1, wherein the filter holder has a guide portion at an end which guides a flow of air toward the filter and forms an air flow path between the guide portion and the FPC bracket.

8. The filtering apparatus of claim 7, wherein the guide portion is integrally formed with the filter holder.

9. The filtering apparatus of claim 8, wherein the filter holder and the FPC bracket are formed by plastic injection molding.

10. The filtering apparatus of claim 7, wherein the guide portion is perpendicular to a lengthwise direction of the filter holder.

11. The filtering apparatus of claim 10, wherein the guide portion has an arch shape.

12. The filtering apparatus of claim 7, wherein a width of the airflow path gradually increases in a direction further away from the filter.

13. A hard disk drive comprising:
    a base with a bracket in a corner of the base;
    a recording/reproducing section; and
    a filter section disposed in an area of relatively great air flow and high air flow velocity when a disk is rotated, the area being between a ramp, an actuator, and the bracket, which filters foreign materials from air in the hard disk drive,
    wherein the filter section includes a filter which filters the foreign materials from air flowing therethrough, a filter holder configured to hold the filter, and a guide portion which guides air toward the filter.

14. The hard disk drive of claim 13, wherein the bracket is a flexible printed circuit (FPC) bracket.

15. The hard disk drive of claim 13, wherein the recording/reproducing section includes a read/write head which records data to a disk and/or reproduces data from the disk and an actuator which moves the read/write head.

16. The hard disk drive of claim 13, wherein the guide portion is disposed at an end portion of the filter holder.

17. The hard disk drive of claim 13, wherein the guide portion is perpendicular to a lengthwise direction of the filter holder.

18. The hard disk drive of claim 13, wherein the guide portion is parallel to the side surface of the bracket.

19. The hard disk drive of claim 13, wherein the guide portion is arch shaped.

20. The hard disk drive of claim 13, wherein the guide portion is integral with the filter holder.

21. A filter system for a hard disk drive having a bracket in a corner thereof, comprising:
   a filter;
   a filter holder which includes a guide portion at an end opposite the bracket and disposed in an area of relatively great air flow and high air flow velocity when a disk is rotated, the area being between a ramp, an actuator, and the bracket; and
   an air flow passage formed between the guide portion and the bracket, which guides air through the filter.

22. The filter system of claim 21, wherein the filter is a porous material through which air is passable.

23. The filter system of claim 22, wherein the porous material is a sponge.

* * * * *

UNITED STATES PATENT AND TRADEMARK OFFICE
CERTIFICATE OF CORRECTION

PATENT NO. : 7,307,812 B2  Page 1 of 1
APPLICATION NO. : 10/910330
DATED : December 11, 2007
INVENTOR(S) : Do-wan Kim et al.

It is certified that error appears in the above-identified patent and that said Letters Patent is hereby corrected as shown below:

Column 8, Line 43, change "airflow" to --air flow--.

Signed and Sealed this

Twenty-fourth Day of June, 2008

JON W. DUDAS
*Director of the United States Patent and Trademark Office*